United States Patent
Lee et al.

(10) Patent No.: US 11,959,819 B2
(45) Date of Patent: Apr. 16, 2024

(54) MULTI-AXIS STRAIN SENSOR

(71) Applicant: Electronics and Telecommunications Research Institute, Daejeon (KR)

(72) Inventors: Su Jae Lee, Daejeon (KR); Seong Hyun Kim, Daejeon (KR); Chan Woo Park, Daejeon (KR); Jae Bon Koo, Daejeon (KR); Bock Soon Na, Daejeon (KR); Ji-Young Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 151 days.

(21) Appl. No.: 17/317,337

(22) Filed: May 11, 2021

(65) Prior Publication Data
US 2021/0356340 A1    Nov. 18, 2021

(30) Foreign Application Priority Data

May 13, 2020   (KR) .................. 10-2020-0057046
May 11, 2021   (KR) .................. 10-2021-0060411

(51) Int. Cl.
*G01L 5/162* (2020.01)
*G01B 7/16* (2006.01)

(52) U.S. Cl.
CPC .............. *G01L 5/162* (2013.01); *G01B 7/16* (2013.01)

(58) Field of Classification Search
CPC ... G01L 1/2287; G01L 1/2231; G01L 1/2275; G01L 1/26
See application file for complete search history.

(56) References Cited

U.S. PATENT DOCUMENTS

| | | | | |
|---|---|---|---|---|
| 4,454,771 A | * | 6/1984 | Shimazoe | G01L 1/18 73/777 |
| 5,959,209 A | * | 9/1999 | Takeuchi | G01L 5/167 73/514.34 |
| 6,595,066 B1 | * | 7/2003 | Kurtz | G01L 9/0055 338/42 |

(Continued)

FOREIGN PATENT DOCUMENTS

| | | |
|---|---|---|
| KR | 10-1500840 | 3/2015 |
| KR | 10-2019-0104705 | 9/2019 |

OTHER PUBLICATIONS

Lifeng Ma et al., "Multi-dimensional strain sensor based on carbon nanotube film with aligned conductive networks", Composites Science and Technology, 2018, pp. 190-197, vol. 165.

(Continued)

*Primary Examiner* — Tran M. Tran
(74) *Attorney, Agent, or Firm* — KILE PARK REED & HOUTTEMAN PLLC

(57) ABSTRACT

Provided is a strain sensor. The strain sensor according to embodiments of the inventive concept includes a flexible substrate, rigid patterns on the flexible substrate, the rigid patterns including a first pattern and a second pattern spaced apart from the first pattern in a first direction, a first electrode on the first pattern, a second electrode on the second pattern, the second electrode being spaced apart from the first electrode, and a piezoresistive layer connecting the first electrode and the second electrode. Here, each of the rigid patterns may have a stiffness greater than that of the flexible substrate.

8 Claims, 10 Drawing Sheets

(56) References Cited

U.S. PATENT DOCUMENTS

| | | | |
|---|---|---|---|
| 6,829,942 B2 * | 12/2004 | Yanai | G01L 1/20 |
| | | | 73/754 |
| 7,401,525 B2 * | 7/2008 | Cobianu | G01L 9/0052 |
| | | | 73/753 |
| 7,997,142 B2 * | 8/2011 | Chiou | G01L 9/0054 |
| | | | 73/715 |
| 8,894,590 B2 * | 11/2014 | Lamoise | A61B 5/103 |
| | | | 600/587 |
| 9,671,297 B2 * | 6/2017 | Sibbett | G06F 3/045 |
| 9,904,393 B2 * | 2/2018 | Frey | G06F 3/04144 |
| 9,970,831 B2 * | 5/2018 | Shih | G01L 1/16 |
| 9,970,832 B2 | 5/2018 | Hong et al. | |
| 10,401,241 B2 * | 9/2019 | Madden | G06F 3/04144 |
| 10,782,818 B2 * | 9/2020 | Deng | G06F 1/1637 |
| 11,026,325 B2 * | 6/2021 | Viberg | G01L 1/26 |
| 11,131,589 B2 * | 9/2021 | Shih | G01P 15/09 |
| 11,175,192 B2 * | 11/2021 | Chen | G01L 1/18 |
| 11,186,481 B2 * | 11/2021 | Yang | B81B 5/00 |
| 2013/0042702 A1 * | 2/2013 | Huang | G01L 1/18 |
| | | | 73/862.625 |
| 2019/0159336 A1 | 5/2019 | Kim et al. | |
| 2019/0323905 A1 | 10/2019 | Kim et al. | |
| 2019/0391651 A1 * | 12/2019 | Chowdhury | G10H 1/0556 |
| 2021/0251073 A1 * | 8/2021 | Viberg | G01K 13/20 |
| 2023/0292620 A1 * | 9/2023 | Polesel | H10N 30/302 |
| | | | 310/311 |

OTHER PUBLICATIONS

Jeng-Hun Lee et al., "Highly Aligned, Anisotropic Carbon Nanofiber Films for Multidirectional Strain Sensors with Exceptional Selectivity", Advanced Functional Materials, 2019, pp. 1-11, vol. 29.

* cited by examiner

MULTI-AXIS STRAIN SENSOR

CROSS-REFERENCE TO RELATED APPLICATIONS

This U.S. non-provisional patent application claims priority under 35 U.S.C. § 119 of Korean Patent Application No. 10-2020-0057046, filed on May 13, 2020, and 10-2021-0060411, filed on May 11, 2021, the entire contents of which are hereby incorporated by reference.

BACKGROUND

The present disclosure herein relates to a strain sensor, and more particularly, to a multi-axis strain sensor including a piezoresistive layer disposed on rigid patterns.

A strain sensor, as a device made of a resistor, is attached to an object to be measured to detect a strain or a stress of the object to be measured by converting mechanical micro-deformation of the object to be measured, which is generated as a force (bending force, tensile force, and compressive force) is applied from the outside, into an electrical signal. The flexible strain sensor, which is capable of operating under large deformation with high sensitivity, has attracted attention because the flexible strain sensor is applicable in various fields such as tactile sensing, soft robots, human motion sensing, personal health monitoring, artificial skins, and human-machine interface. In recent years, the multi-axis strain sensor capable of precisely sensing deformations in multiple directions, which are generated by complex and various human body movements, in a real-time manner has been demanded, and various researches and developments have been implemented for overcoming a limitation of a single axis strain sensor.

SUMMARY

The present disclosure provides a multi-axis strain sensor that has high sensitivity, is easily manufactured, and is capable of detecting a magnitude and a direction of a strain.

An embodiment of the inventive concept provides a strain sensor including: a flexible substrate; rigid patterns on the flexible substrate, the rigid patterns including a first pattern and a second pattern spaced apart from the first pattern in a first direction; a first electrode on the first pattern; a second electrode on the second pattern, the second electrode being spaced apart from the first electrode; and a piezoresistive layer connecting the first electrode and the second electrode, and each of the rigid patterns has a stiffness greater than that of the flexible substrate.

In an embodiment, each of the rigid patterns may have a stiffness greater than that of the piezoresistive layer.

In an embodiment, a distance between the first pattern and the second pattern may be greater than a thickness of the first pattern.

In an embodiment, the rigid patterns may have side surfaces that face each other, and the piezoresistive layer may vertically overlap the side surfaces.

In an embodiment, the first pattern may have a first side surface that faces the second pattern, and the second pattern may have a second side surface that faces the first side surface and is parallel to the first side surface.

In an embodiment, the first pattern may have a first side surface that faces the second pattern, the second pattern may have a second side surface that faces the first side surface, and a distance between the first side surface and the second side surface may be constant along a second direction perpendicular to the first direction.

In an embodiment, the first pattern may have a first width in a second direction perpendicular to the first direction, the piezoresistive layer may have a second width in the second direction, and the first width may be greater than the second width.

In an embodiment, the strain sensor may further include an upper capping layer configured to cover the first electrode, the second electrode, and the piezoresistive layer.

In an embodiment, each of the rigid patterns may have a stiffness greater than that of the upper capping layer.

In an embodiment, the strain sensor may further include a first pad electrically connected to the first electrode and a second pad electrically connected to the second electrode, which are disposed on the flexible substrate.

In an embodiment, the strain sensor may further include a wire connected to the first electrode, and the wire may have a serpentine-pattern shape.

In an embodiment of the inventive concept, a strain sensor includes: a flexible substrate; first rigid patterns including a first pattern and a second pattern, which are spaced apart from each other in a first direction, on the flexible substrate; second rigid patterns including a third pattern and a fourth pattern, which are spaced apart from each other in a second direction, on the flexible substrate; a first electrode on the first pattern; a second electrode on the second pattern, the second electrode being spaced apart from the first electrode; a third electrode on the third pattern; a fourth electrode on the fourth pattern, the fourth electrode being spaced apart from the third electrode; a first piezoresistive layer connecting the first electrode and the second electrode; and a second piezoresistive layer connecting the third electrode and the fourth electrode. Here, the first direction and the second direction are parallel to a top surface of the flexible substrate, and the first direction and the second direction cross each other.

In an embodiment, each of the rigid patterns may have a stiffness greater than that of the flexible substrate.

In an embodiment, the strain sensor may further include: a first wire electrically connecting the first electrode with a first pad; a second wire electrically connecting the second electrode with a second pad; and a third wire electrically connecting the third electrode with the second electrode.

In an embodiment, a distance between the first pattern and the second pattern may be greater than a thickness of the first pattern.

In an embodiment, each of the rigid patterns may have a stiffness greater than that of the piezoresistive layer.

In an embodiment, the strain sensor may further include an upper capping layer configured to cover the first electrode, the second electrode, the third electrode, the fourth electrode, the first piezoresistive layer, and the second piezoresistive layer.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
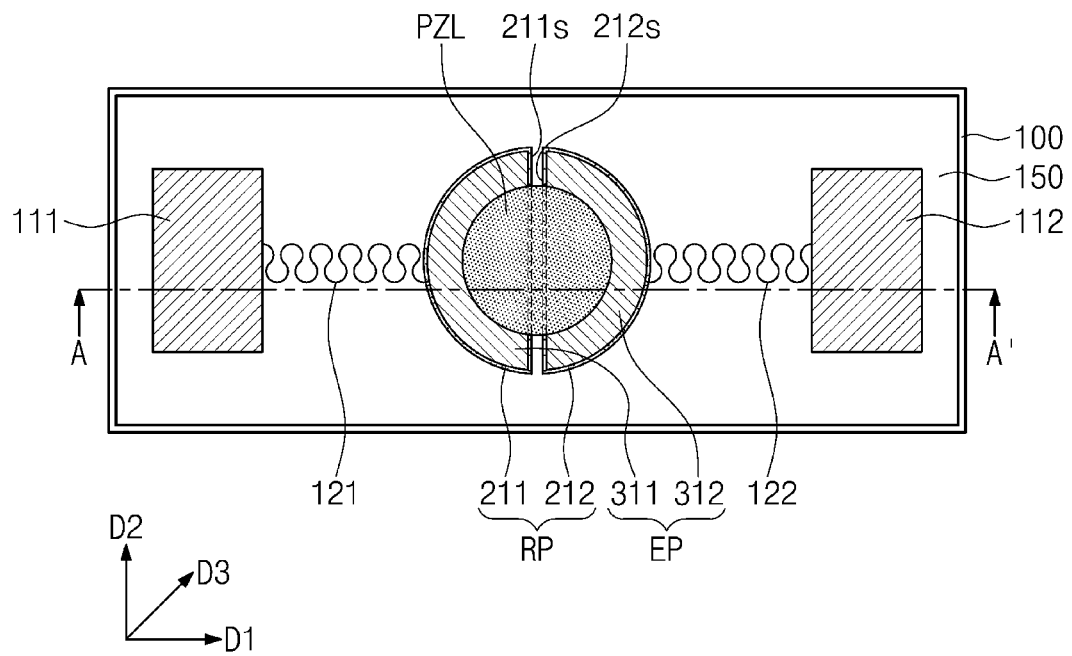
FIG. 1 is a plan view illustrating a strain sensor according to an embodiment of the inventive concept.

Exemplary embodiments of the present invention will be described with reference to the accompanying drawings so as to sufficiently understand constitutions and effects of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Rather, these embodiments are provided so that this disclosure will be thorough and complete, and will fully convey the scope of the present invention to those skilled in the art. Further, the present invention is only defined by scopes of claims.

In the following description, the technical terms are used only for explaining a specific exemplary embodiment while not limiting the present disclosure. The terms of a singular form may include plural forms unless referred to the contrary. The meaning of 'comprises' and/or 'comprising' specifies a component, a step, an operation and/or an element does not exclude other components, steps, operations and/or elements.

In the specification, it will be understood that when a layer (or film) is referred to as being 'on' another layer or substrate, it can be directly on the other layer or substrate, or intervening layers may also be present.

Also, though terms like a first, a second, and a third are used to describe various regions and layers (or films) in various embodiments of the present invention, the regions and the layers are not limited to these terms. These terms are used only to discriminate one region or layer (or film) from another region or layer (or film). Therefore, a layer referred to as a first layer in one embodiment can be referred to as a second layer in another embodiment. An embodiment described and exemplified herein includes a complementary embodiment thereof. Like reference numerals refer to like elements throughout.

Unless terms used in embodiments of the present invention are differently defined, the terms may be construed as meanings that are commonly known to a person skilled in the art.

Figure 2:
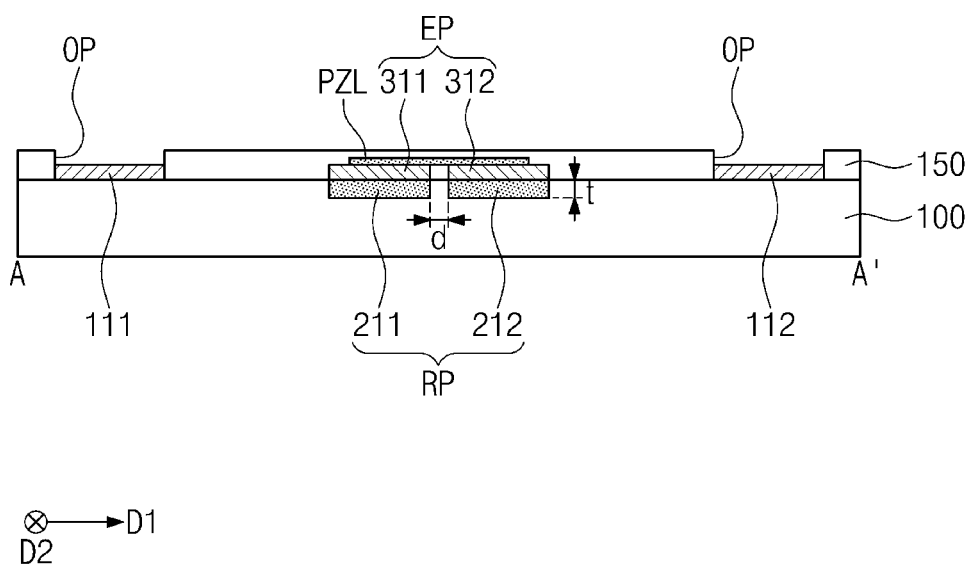
FIG. 2 is a cross-sectional view taken along line A-A' of FIG. 1.

FIG. 1 is a plan view illustrating a strain sensor according to an embodiment of the inventive concept. FIG. 2 is a cross-sectional view taken along line A-A' of FIG. 1.

Referring to FIG. 1, the strain sensor according to an embodiment of the inventive concept may include a flexible substrate 100, electrode patterns EP, rigid patterns RP, a piezoresistive layer PZL, pads 111 and 112, and a flexible capping layer 150. The flexible substrate 100 and the flexible capping layer 150 may be deformed by an external force. For example, each of the flexible substrate 100 and the flexible capping layer 150 may be stretched or bent in a specific direction. As the flexible substrate 100 and the flexible capping layer 150 are deformed, an external force may be applied to the piezoresistive layer PZL. As the piezoresistive layer PZL receives an external force, a resistance thereof may be varied.

The electrode patterns EP may receive a test signal from an external device and provide the received test signal to the piezoresistive layer PZL. For example, the test signal may be a voltage or a current. The piezoresistive layer PZL may receive the test signal and output a detection signal. The detection signal may be a current or a voltage corresponding to the resistance of the piezoresistive layer PZL. The piezoresistive layer PZL may have the resistance that increases in proportional to a size of the external force. The piezoresistive layer PZL may output, as the detection signal, a current or a voltage less than the test signal as the resistance thereof increases.

The rigid patterns RP may be disposed below the electrode patterns EP. Each of the rigid patterns RP may have a stiffness greater than that of each of the flexible substrate 100 and the flexible capping layer 150. In other words, when the same external force is applied to the rigid patterns RP, the flexible substrate 100, and the flexible capping layer 150, the rigid patterns RP may have deformation less than that of each of the flexible substrate 100 and the flexible capping layer 150. For example, the rigid patterns RP may not have ductility and stretchability and may not be bent or stretched although an external force is applied.

The rigid patterns RP may restrict a direction of deformation of the piezoresistive layer PZL when an external force is applied to the flexible substrate 100. Specifically, the rigid patterns RP may allow the piezoresistive layer PZL to be stretched or bent in a specific direction. Also, the rigid patterns RP may restrict the piezoresistive layer PZL from being stretched or bent in another direction except for the specific direction. Thus, the strain sensor may selectively detect a strain in the specific direction.

In detail, referring to FIGS. 1 to 2, the flexible substrate 100 may be provided. The flexible substrate 100 may have a stiffness less than that of each of the rigid patterns RP. For example, the flexible substrate 100 may include a material having a Young's modulus less than that of each of materials of the rigid patterns RP. For example, the flexible substrate 100 may include elastomer. For example, the flexible substrate 100 may include one of PDMS and Ecoflex.

The flexible substrate 100 may have stretchability and/or elasticity. The flexible substrate 100 may be bent by an external force or stretched in a horizontal direction. According to an embodiment, the flexible substrate 100 may be stretched in a first direction D1, a second direction D2, and a third direction D3. The first direction D1, the second direction D2, and the third direction D3 may be parallel to a top surface and/or a bottom surface of the flexible substrate 100. The first direction D1 and the second direction D2 may be perpendicular to each other. The third direction D3 may cross the first direction D1 and the second direction D2. For example, the third direction D3 may be a direction bisecting an angle between the first direction D1 and the second direction D2. That is, an angle between the first direction D1 and the second direction D2 may be about 90°, and an angle between the third direction D3 and each of the first direction D1 and the second direction D2 may be about 45°.

The flexible substrate 100 may have a flat bottom surface and a constant thickness. Since the flexible substrate 100 has the constant thickness, a tensile strain thereof caused by an external force may be constant regardless of directions. That is, the flexible substrate 100 may have the same tensile strain in all of the first direction D1, the second direction D2, and the third direction D3.

The rigid patterns RP may be disposed on the flexible substrate 100. The rigid patterns RP may be disposed between a bottom surface of the electrode patterns EP and the flexible substrate 100. The rigid patterns RP may include a first pattern 211 and a second pattern 212, which are spaced apart from each other in the first direction D1. According to an embodiment, the first pattern 211 and the second pattern 212 may be buried in an upper portion of the flexible substrate 100. For example, the first pattern 211 and the second pattern 212 may be provided in a trench defined in the upper portion of the flexible substrate 100. Each of the first pattern 211 and the second pattern 212 may include an insulating material. Also, each of the first pattern 211 and the second pattern 212 may have a stiffness greater than that of each of the piezoresistive layer PZL, the flexible substrate 100, and the flexible capping layer 150. Each of the first pattern 211 and the second pattern 212 may have a Young's modulus greater than that of each of materials of the piezoresistive layer PZL, the flexible substrate 100, and the flexible capping layer 150. For example, each of the first pattern 211 and the second pattern 212 may include glass, ceramic, or fiber reinforced plastics FRP.

The first pattern 211 and the second pattern 212 may have side surfaces facing each other. Specifically, the first pattern 211 may have a first side surface 211s facing the second pattern 212. The second pattern 212 may have a second side surface 212s facing the first pattern 211. The first side surface 211s and the second side surface 212s may be parallel to each other and spaced apart from each other in the first direction D1. A distance d between the first side surface 211s and the second side surface 212s may be constant in the second direction D2. Thus, a direction in which the piezoresistive layer PZL is stretched or bent may be further precisely restricted to a specific direction (e.g., the first direction D1). Also, the distance d between the first side surface 211s and the second side surface 212s may be greater than a thickness t of each of the rigid patterns RP. Thus, corners of the first pattern 211 and the second pattern 212 may be prevented from being interfered with each other while the flexible substrate 100 is bent. Thus, the piezoresistive layer PZL may be prevented from being nonlinearly deformed with respect to an external force, and reliability of the strain sensor may improve.

According to an embodiment, the distance d between the first pattern 211 and the second pattern 212 may be less than each of widths of the first pattern 211 and the second pattern 212 in the first direction D1.

According to an embodiment, each of the other side surfaces of the first pattern 211 and the second pattern 212 may have a rounded shape. For example, each of the first pattern 211 and the second pattern 212 may have a semicircular shape in terms of a plane. The first pattern 211 and the second pattern 212 may shapes that are symmetrical to each other in the first direction D1.

According to an embodiment, the first pattern 211 and the second pattern 212 may each have a polygonal shape and have shapes that are asymmetrical to each other. For example, each of the first pattern 211 and the second pattern 212 may have a rectangular shape.

The electrode patterns EP may be disposed on the flexible substrate 100. The electrode patterns EP may be disposed on top surfaces of the rigid patterns RP and disposed adjacent to a top surface of the flexible substrate 100. Bottom surfaces of the electrode patterns EP may be partially spaced apart from at least the flexible substrate 100 with the rigid patterns RP therebetween. For example, the electrode patterns EP may completely overlap the rigid patterns RP, and the bottom surfaces of the electrode patterns EP may be completely covered by the rigid patterns RP. Since the electrode patterns EP are protected by the rigid patterns RP, the electrode patterns EP may not be deformed although the flexible substrate 100 and the flexible capping layer 150 are deformed by an external force.

The electrode patterns EP may include a first electrode 311 and a second electrode 312. The first electrode 311 and the second electrode 312 may be spaced apart from each other in the first direction D1. The first electrode 311 and the second electrode 312 may each include a conductive material and be electrically connected by the piezoresistive layer PZL. For example, each of the first electrode 311 and the second electrode 312 may include metal. For example, the electrode patterns EP may include one of gold, silver, platinum, copper, chrome, aluminum, and nickel. According to an embodiment, each of the first electrode 311 and the second electrode 312 may have a semicircular shape. The first electrode 311 and the second electrode 312 may have shapes that are symmetrical to each other in the first direction D1. According to an embodiment, the first electrode 311 and the second electrode 312 may each have a circular or polygonal shape and have shapes that are asymmetrical to each other.

The first electrode 311 and the second electrode 312 may be disposed on the first pattern 211 and the second pattern 212, respectively. According to an embodiment, the first electrode 311 may have the same or similar shape as the first pattern 211, and the second electrode 312 may have the same or similar shape as the second pattern 212.

According to an embodiment, side surfaces of the first electrode 311 may be aligned with side surfaces of the first pattern 211, and side surfaces of the second electrode 312 may be aligned with side surfaces of the second pattern 212. Thus, a distance between the first electrode 311 and the second electrode 312 may be equal to the distance d between the first pattern 211 and the second pattern 212.

The piezoresistive layer PZL may be disposed on the electrode patterns EP. The piezoresistive layer PZL may cover at least a portion of a top surface of the first electrode 311 and at least a portion of a top surface of the second electrode 312. The piezoresistive layer PZL may vertically overlap the side surfaces facing each other (i.e., the first side surface 211s and the second side surface 212s) of the rigid patterns RP. The piezoresistive layer PZL may electrically connect the first electrode 311 and the second electrode 312. The piezoresistive layer PZL may have a stiffness less than that of each of the rigid patterns RP. The piezoresistive layer PZL may have flexibility and conductivity. The piezoresistive layer PZL may be stretched or bent as the flexible substrate 100 is deformed. The piezoresistive layer PZL may be restricted from being stretched or bent in a specific direction by the rigid patterns RP. For example, the piezoresistive layer PZL may include at least one of a two-dimensional conductive network material including a carbon nanotube (CNT) and a metal nanowire, a thin-film made of metal nanoparticles, a graphene film, a conductive sheet including CNT, and a polymer composite using conductive nanofillers such as CNT, carbon black NP, and graphene flakes. For example, the piezoresistive layer PZL may include a polymer composite material using carbon nanoparticles as nanofilters.

According to an embodiment, the piezoresistive layer PZL may have a resistance change rate that is different according to directions in which the flexible substrate 100 is stretched. For example, in an embodiment in which the first pattern 211 and the second pattern 212 are spaced apart from each other in the first direction D1, the piezoresistive layer PZL may have the biggest resistance change rate when an external force is applied to the flexible substrate 100 in the first direction D1. Specifically, the resistance change rate of the piezoresistive layer PZL with respect to the external force applied to the flexible substrate 100 may have a first change rate when the external force is applied to the flexible substrate 100 in the first direction D1. The resistance change rate of the piezoresistive layer PZL with respect to the external force applied to the flexible substrate 100 may have a second change rate when the external force is applied to the flexible substrate 100 in the second direction D2. The resistance change rate of the piezoresistive layer PZL with respect to the external force applied to the flexible substrate 100 may have a third change rate when the external force is applied to the flexible substrate 100 in the third direction D3. Here, the first change rate may be greater than each of the second change rate and the third change rate. Also, the third change rate may be greater than the second change rate. The resistance change rate of the piezoresistive layer PZL according to the direction of the external force applied to the flexible substrate 100 will be described in more detail later with reference to FIGS. 4 and 7.

The pads 111 and 112 may be disposed on the flexible substrate 100. The pads 111 and 112 may connect the strain sensor with an external device. The pads 111 and 112 may include a first pad 111 and a second pad 112. The first pad 111 may be electrically connected with the first electrode 311, and the second pad 112 may be electrically connected with the second electrode 312. Each of the first pad 111 and the second pad 112 may include a conductive material. For example, each of the first pad 111 and the second pad 112 may include one of gold, silver, platinum, copper, chrome, aluminum, and nickel.

Wires 121 and 122 may connect the pads 111 and 112 with the electrode patterns EP. The wires 121 and 122 may be flexible wires. The wires 121 and 122 may have stretchability and/or elasticity. Thus, although the wires 121 and 122 are bent or stretched, electrical connection between the pads 111 and 112 and the electrode patterns EP may not be broken. According to an embodiment, each of the wires 121 and 122 may have a serpentine-pattern shape. For example, each of the wires 121 and 122 may have a structure that is repeatedly bent in a S-shape. Each of the wires 121 and 122 may have a length greater than a distance between each of the pads 111 and 112 and each of the electrode patterns EP. For example, each of the wires 121 and 122 may include one of gold, silver, platinum, copper, chrome, aluminum, and nickel. According to an embodiment, each of the wires 121 and 122 may include a flexible conductive material. For example, each of the wires 121 and 122 may be a flexible wire including a silver (Ag) paste.

The flexible capping layer 150 may be provided on the top surface of the flexible substrate 100. The flexible capping layer 150 may cover the piezoresistive layer PZL and the electrode patterns EP. The flexible capping layer 150 may have a stiffness less than that of each of the rigid patterns RP. The flexible capping layer 150 may be deformed together with the flexible substrate 100. The flexible capping layer 150 may protect the piezoresistive layer PZL, the rigid patterns RP, the electrode patterns EP, and the wires 121 and 122. For example, the flexible capping layer 150 may include an insulating material and prevent the piezoresistive layer PZL, the electrode patterns EP, and the wires 121 and 122 from being polluted or electrically short-circuited. The flexible capping layer 150 may prevent the piezoresistive layer PZL, the rigid patterns RP, the electrode patterns EP, and the wires 121 and 122 from being separated and dropped from the flexible substrate 100 while the flexible substrate 100 is deformed.

Specifically, the flexible capping layer 150 may cover at least a portion of the top surface of the flexible substrate 100. The flexible capping layer 150 may cover side surfaces of the first electrode 311 and the second electrode 312. The flexible capping layer 150 may cover at least a portion of top surfaces of the first electrode 311 and the second electrode 312. The flexible capping layer 150 may cover side surfaces and a top surface of the piezoresistive layer PZL. Also, the flexible capping layer 150 may cover the wires 121 and 122. For example, the flexible capping layer 150 may include one of PDMS and Ecoflex. According to an embodiment, the flexible capping layer 150 may include the same material as the flexible substrate 100.

The flexible capping layer 150 may have openings OP exposing the pads 111 and 112. The pads 111 and 112 may be provided in the openings OP on the top surface of the flexible substrate 100. The flexible capping layer 150 may cover side surfaces of the pads 111 and 112. The flexible capping layer 150 may not cover at least a portion of top surfaces of the pads 111 and 112. According to an embodiment, each of the top surfaces of the pads 111 and 112 may have a vertical level lower than that of a top surface of the flexible capping layer 150.

Figure 3:
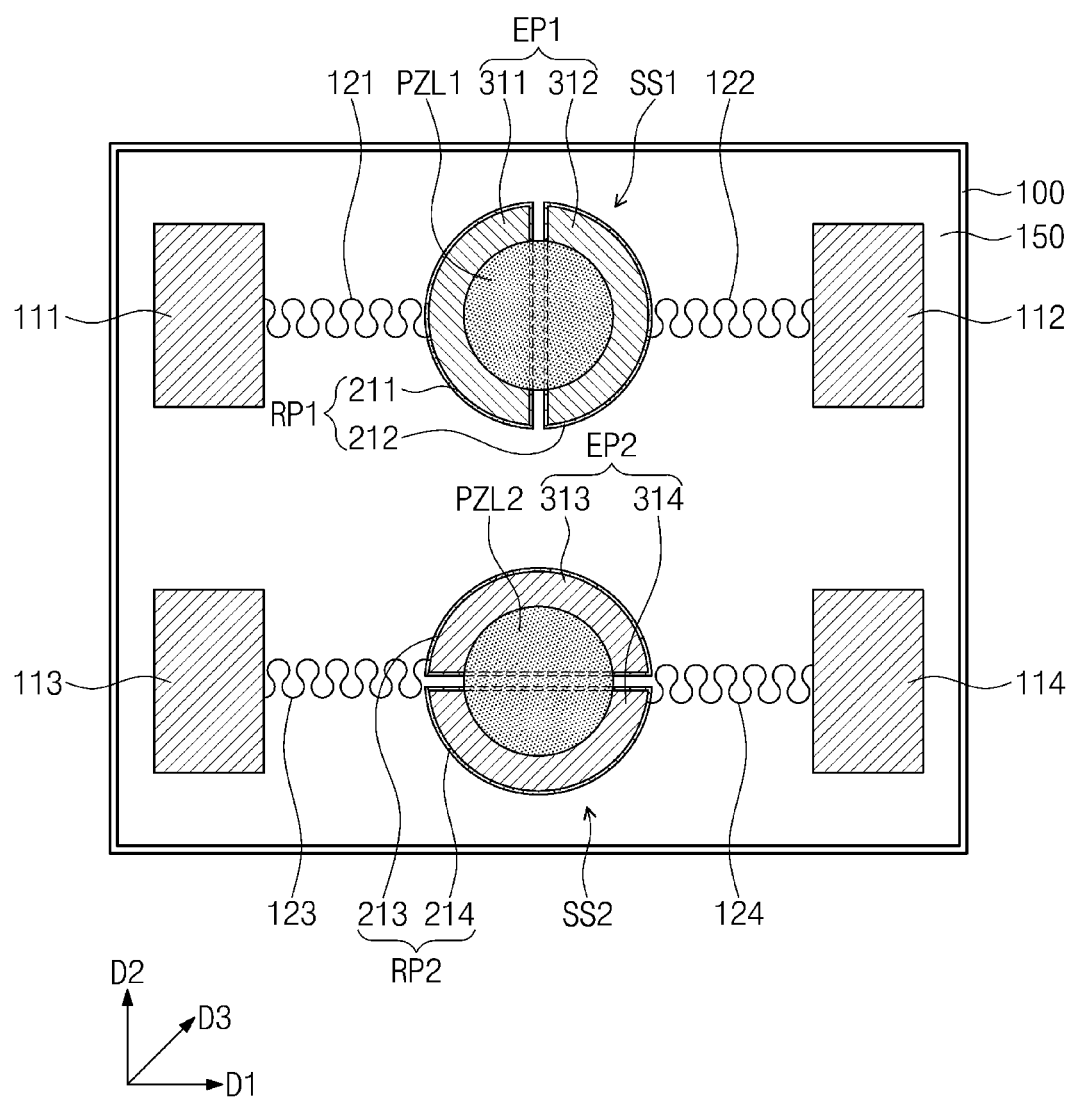
FIGS. 3 to 4 are plan views illustrating strain sensors according to an embodiment of the inventive concept.

FIG. 3 is a plan view illustrating a strain sensor according to an embodiment of the inventive concept. For a concise description, a detailed description on the same or similar components as those described above will be omitted.

Referring to FIG. 3, the strain sensor according to an embodiment of the inventive concept may be a biaxial strain sensor. The strain sensor may include a first unit sensor SS1 and a second unit sensor SS2. The first unit sensor SS1 and the second unit sensor SS2 may output different detection signals with respect to deformation of the flexible substrate 100 in the same direction. The detection signal outputted from the first unit sensor SS1 and the detection signal outputted from the second unit sensor SS2 may be calculated together to further exactly detect a direction of a strain applied to the flexible substrate 100.

First and second rigid patterns RP1 and RP2 of the first unit sensor SS1 and the second unit sensor SS2 may restrict deformation directions of first and second piezoresistive layers PZL1 and PZL2 to be different directions. For example, the first piezoresistive layer PZL1 may have the largest resistance change rate when the flexible substrate 100 extends in the first direction D1. For example, the first piezoresistive layer PZL1 may have the largest resistance change rate when the flexible substrate 100 extends in the first direction D1.

Specifically, the first unit sensor SS1 may include first rigid patterns RP1, first electrode patterns EP1, and a first piezoresistive layer PLZ1. The first rigid patterns RP1, the first electrode patterns EP1, and the first piezoresistive layer PLZ1 may the same as the rigid patterns RP, the electrode patterns EP, and the piezoresistive layer PLZ, which are described with reference to FIG. 1. For example, the first rigid patterns RP1 may include a first pattern 211 and a second pattern 212, which are spaced apart from each other in the first direction D1.

The second unit sensor SS2 may include second rigid patterns RP2, second electrode patterns EP2, and a second piezoresistive layer PLZ2. For example, the second rigid patterns RP2 may include a third pattern 213 and a fourth pattern 214, which are spaced apart from each other in the second direction D2. That is, the third pattern 213 and the fourth pattern 214 may be spaced apart from each other in a direction that is different from the direction in which the first pattern 211 and the second pattern 212 are spaced apart from each other.

The second electrode patterns EP2 may include a third electrode 313 disposed on the third pattern 213 and a fourth electrode 314 disposed on the fourth pattern 214. The third electrode 313 may be connected with the third pad 113 through a third wire 123. The fourth electrode 314 may be connected with the fourth pad 114 through a fourth wire 124. The second piezoresistive layer PLZ2 may be disposed on the third electrode 313 and the fourth electrode 314 and connect the third electrode 313 and the fourth electrode 314 in the second direction D2. The third pattern 213 and the fourth pattern 214 may restrict deformation except for deformation of the second piezoresistive layer PLZ2 in the second direction D2.

The resistance change rate of the second piezoresistive layer PLZ2 with respect to the external force applied to the flexible substrate 100 may have a fourth change rate when the external force is applied to the flexible substrate 100 in the second direction D2. The resistance change rate of the second piezoresistive layer PLZ2 with respect to the external force applied to the flexible substrate 100 may have a fifth change rate when the external force is applied to the flexible substrate 100 in the first direction D1. The resistance change rate of the second piezoresistive layer PLZ2 with respect to the external force applied to the flexible substrate 100 may have a sixth change rate when the external force is applied to the flexible substrate 100 in the third direction D3. Here, the fourth change rate may be greater than each of the fifth change rate and the sixth change rate. Also, the sixth change rate may be greater than the fifth change rate. According to an embodiment, a direction of a strain applied to the flexible substrate 100 may be detected through a size of each of the first to sixth change rates.

Figure 4:
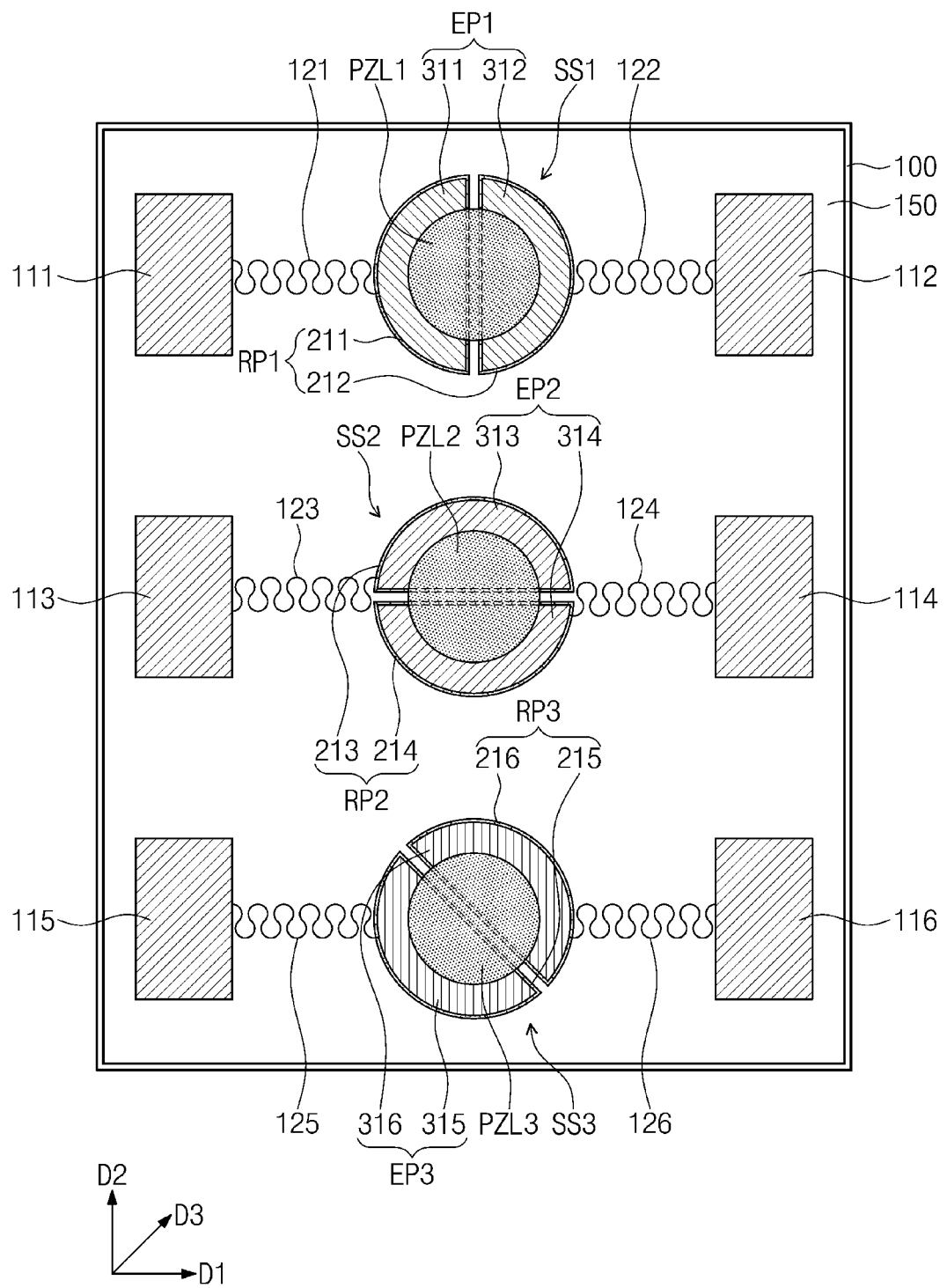

FIG. 4 is a plan view illustrating a strain sensor according to an embodiment of the inventive concept. For a concise description, a detailed description on the same or similar components as those described above will be omitted.

Referring to FIG. 4, the strain sensor according to an embodiment of the inventive concept may further include a third unit sensor SS3. The third unit sensor SS3 may output a detection signal different from the first unit sensor SS1 and the second unit sensor SS2 with respect to the deformation of the flexible substrate 100. The detection signal outputted from the third unit sensor SS3 may be calculated together with the detection signals outputted from the first unit sensor SS1 and the second unit sensor SS2 to further exactly detect the direction of the strain applied to the flexible substrate 100.

The third unit sensor SS3 may include third rigid patterns RP3, third electrode patterns EP3, and a third piezoresistive layer PLZ3. The third rigid patterns RP3 may include a fifth pattern 215 and a sixth pattern 216, which are spaced apart from each other in the second direction D2. The third electrode patterns EP3 may include a fifth electrode 315 disposed on the fifth pattern 215 and a sixth electrode 316 disposed on the sixth pattern 216. The fifth electrode 315 may be connected with the fifth pad 115 through a fifth wire 125. The sixth electrode 316 may be connected with the sixth pad 116 through a sixth wire 126. The third piezoresistive layer PZL3 may be disposed on the fifth electrode 315 and the sixth electrode 316 and connect the fifth electrode 315 and the sixth electrode 316 in the third direction D3. The fifth pattern 215 and the sixth pattern 216 may restrict deformation except for deformation of the third piezoresistive layer PLZ2 in the third direction D3.

Figure 5:
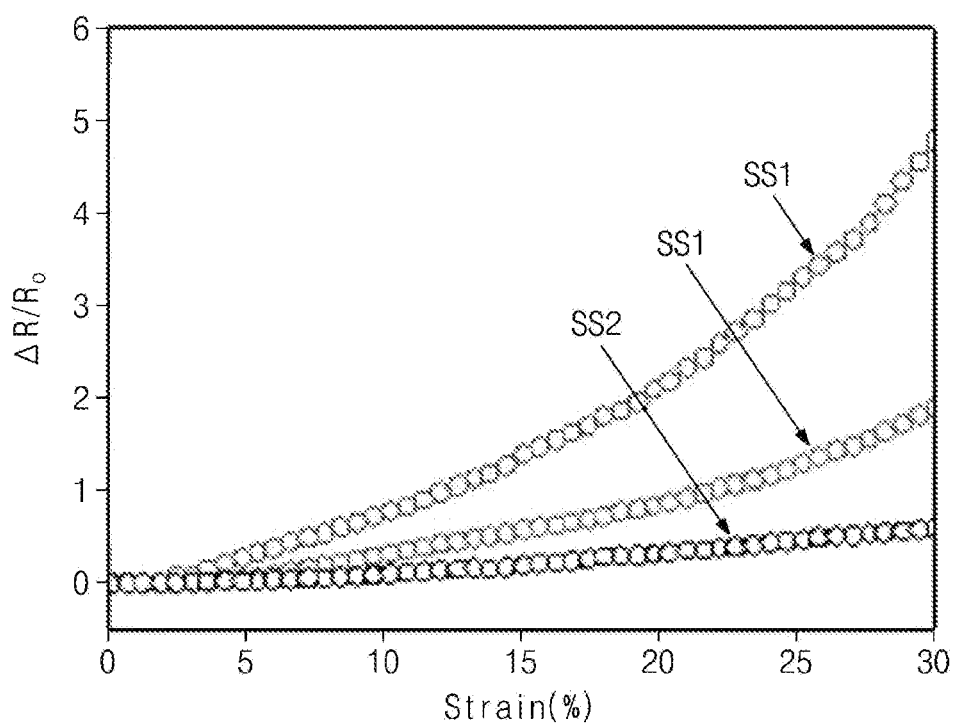
FIG. 5 is a graph according to an experimental example 1 of the inventive concept, representing resistance change rates of the first to fourth piezoresistive layers according to a strain applied to a flexible substrate.

FIG. 5 is a graph according to an experimental example 1 of the inventive concept, representing resistance change rates of the first to third piezoresistive layers according to the strain applied to the flexible substrate.

Experimental Example 1

The strain sensor according to an embodiment of the inventive concept is manufactured based on FIG. 4. Resistances of the first to third piezoresistive layers PZL1, PZL2, and PZL3 are measured by applying a test signal to the first to third sensor structures SS1, SS2, and SS3 without applying an external force to the flexible substrate 100. Thereafter, the resistances of the first to third piezoresistive layers PZL1, PZL2, and PZL3 are measured by applying the external force to the flexible substrate 100 in the first direction D1 and applying the test signal to the first to third sensor structures SS1, SS2, and SS3. Thereafter, the resistances of the first to third piezoresistive layers PZL1, PZL2, and PZL3 are measured while varying a magnitude of the external force applied to the flexible substrate 100 in the first direction D1. Resistance change rates of the first to third piezoresistive layers PZL1, PZL2, and PZL3 according to the strain in the first direction D1 are calculated and shown in FIG. 5.

Referring to FIG. 5, it may be known that the resistance change rate of the first piezoresistive layer PZL1 is measured greater than that of each of the second and third piezoresistive layers PZL2 and PZL3. Also, it may be known that the resistance change rate of the third piezoresistive layer PZL3 is measured greater than that of the second piezoresistive layer PZL2. Thus, it may be known that the direction of the strain applied to the flexible substrate 100 may be detected with reference to the resistance change rate measured by each of the first to third sensor structures SS1, SS2, and SS3.

Figure 6:
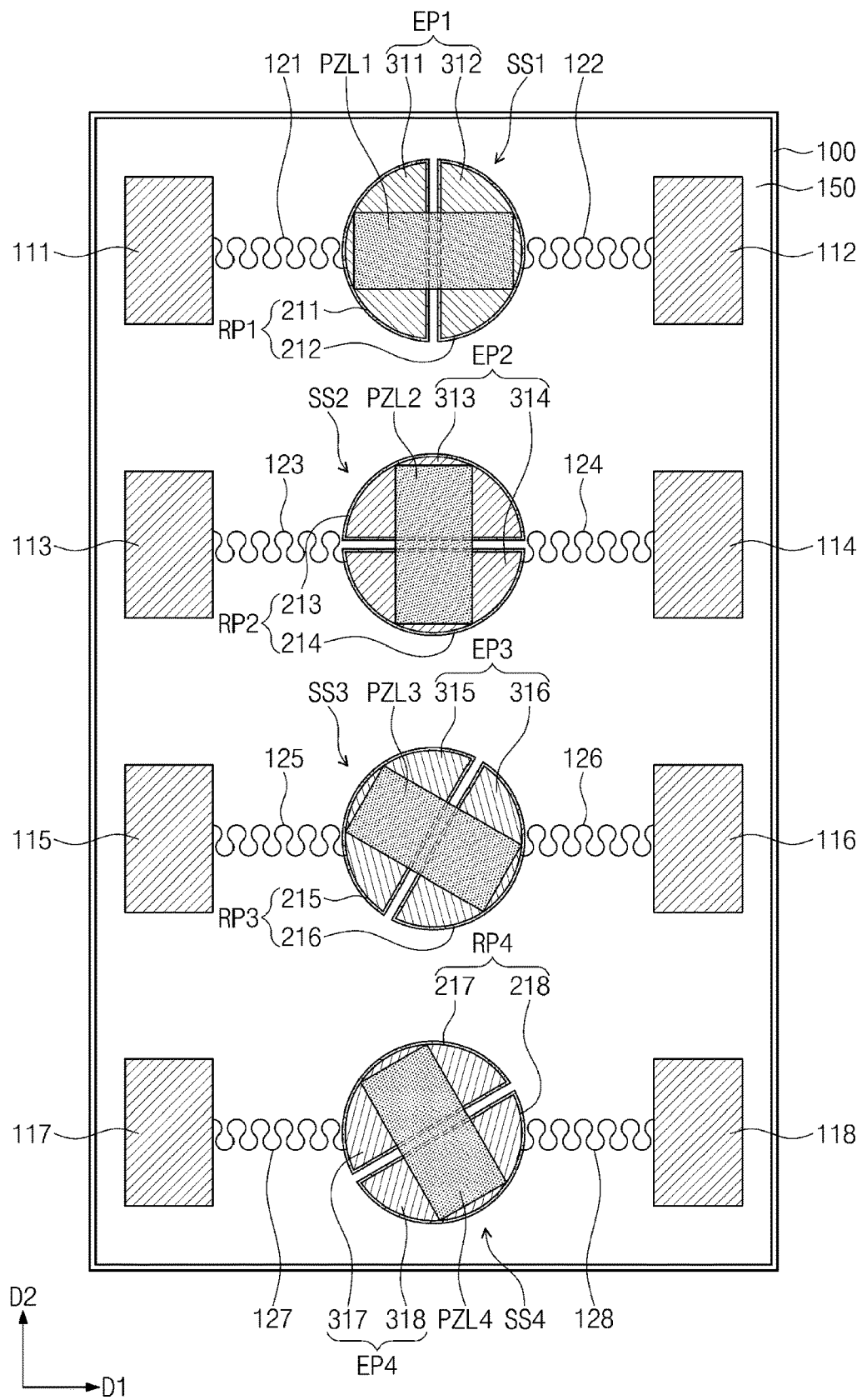
FIG. 6 is a plan view illustrating a strain sensor according to an embodiment of the inventive concept.

FIG. 6 is a plan view illustrating a strain sensor according to an embodiment of the inventive concept. For a concise description, a detailed description on the same or similar components as those described above will be omitted.

Referring to FIG. 6, the strain sensor according to an embodiment of the inventive concept may include first to fourth sensor structures SS1, SS2, SS3, and SS4. First rigid patterns RP1 of the first unit sensor SS1 may include a first pattern 211 and a second pattern 212, which are spaced apart from each other in the first direction D1. Second rigid patterns RP2 of the second unit sensor SS2 may include a third pattern 213 and a fourth pattern 214, which are spaced apart from each other in the second direction D2.

The third and fourth sensor structures SS3 and SS4 may include patterns that are spaced apart from each other in a direction crossing the first direction D1 and the second direction D2. A fifth pattern 215 and a sixth pattern 216 of the third unit sensor SS3 may be spaced apart from each other in a direction angled about 30° with the first direction D1. A seventh pattern 217 and an eighth pattern 218 of the fourth unit sensor SS4 may be spaced apart from each other in a direction angled about 60° with the first direction D1.

According to an embodiment, each of the piezoresistive layers PZL1, PZL2, PZL3, and PZL4 may have a rectangular shape.

Figure 7:
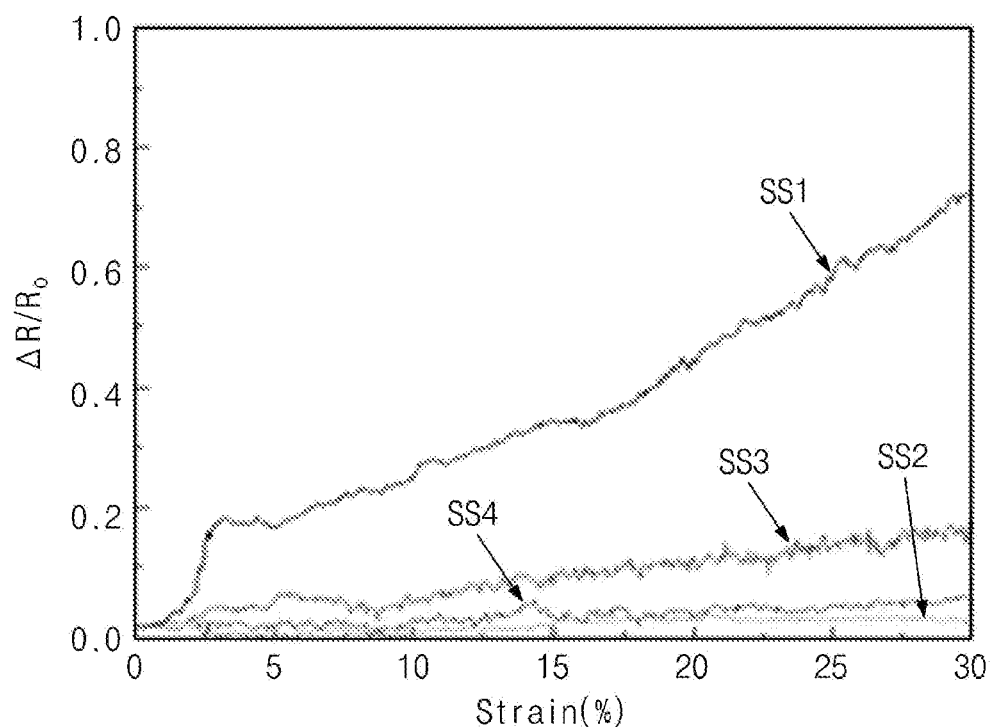
FIG. 7 is a graph according to an experimental example 2 of the inventive concept, representing resistance change rates of the first to fourth piezoresistive layers according to a strain applied to a flexible substrate.

FIG. 7 is a graph according to an experimental example 2 of the inventive concept, representing resistance change rates of the first to fourth piezoresistive layers according to the strain applied to the flexible substrate.

The strain sensor according to an embodiment of the inventive concept is manufactured based on FIG. 6. Resistances of the first to fourth piezoresistive layers PZL1, PZL2, PZL3, and PZL4 are measured by applying a test signal to first to fourth sensor structures SS1, SS2, SS3, and SS4 without applying an external force to the flexible substrate 100. Thereafter, the resistances of the first to fourth piezoresistive layers PZL1, PZL2, PZL3, and PZL4 are measured by applying the external force to the flexible substrate 100 in the first direction D1 and applying the test signal to the first to fourth sensor structures SS1, SS2, SS3, and SS4. Thereafter, the resistances of the first to fourth piezoresistive layers PZL1, PZL2, PZL3, and PZL4 are measured while varying a magnitude of the external force applied to the flexible substrate 100 in the first direction D1. Resistance change rates of the first to fourth piezoresistive layers PZL1, PZL2, PZL3, and PZL4 according to the strain in the first direction D1 are calculated and shown in FIG. 7.

Referring to FIG. 7, it may be known that the direction of the strain applied to the flexible substrate 100 may be detected with reference to the resistance change rate measured by each of the first to fourth sensor structures SS1, SS2, SS3, and SS4.

FIGS. 8 to 11 are plan views illustrating strain sensors according to an embodiment of the inventive concept. For a concise description, a detailed description on the same or similar components as those described above will be omitted.

Figure 8:
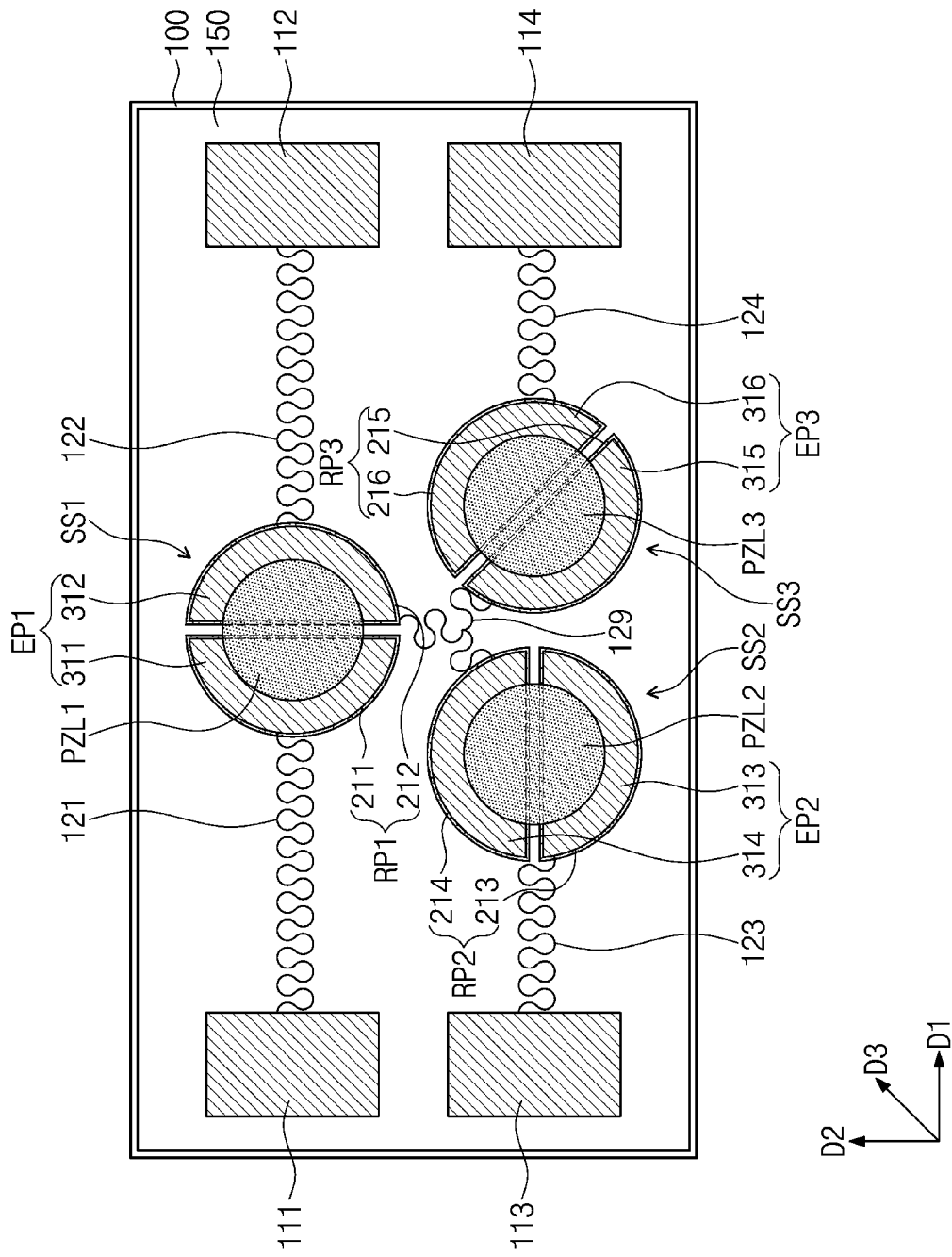
FIGS. 8 to 11 are plan views illustrating strain sensors according to an embodiment of the inventive concept.

Referring to FIG. 8, a first electrode 311 of a first unit sensor SS1 may be electrically connected with a first pad 111 through a first wire 121. A second electrode 312 may be electrically connected with the first pad 111 through a second wire 122.

A third electrode 311 of a second unit sensor SS2 may be electrically connected with a third pad 113 through a third wire 123. A sixth electrode 316 of a third unit sensor SS3 may be electrically connected with a fourth pad 114 through a fourth wire 124.

A second electrode 312 of the first unit sensor SS1, a fourth electrode 314 of the second unit sensor SS2, and a fifth electrode 315 of the third unit sensor SS3 may be electrically connected to each other through a common wire 129. The common wire 129 may be a common ground wire for signal input and output of the first to third sensor structures SS1, SS2, and SS3. The common wire 129 may be connected to each of the second electrode 312, the fourth electrode 314, and the fifth electrode 315 and electrically connect the second electrode 312, the fourth electrode 314, and the fifth electrode 315 to each other. The common wire 129 may have a serpentine-pattern shape. For example, the common wire 129 may have a structure that is repeatedly bent in a S-shape. For example, the common wire 129 may include one of gold, silver, platinum, copper, chrome, aluminum, and nickel. According to an embodiment, the common wire 129 may include a flexible conductive material. For example, the common wire 129 may be a flexible wire including a silver (Ag) paste. As some electrodes are connected through the common wire 129, the number of pads of the strain sensor may be reduced.

Figure 9:
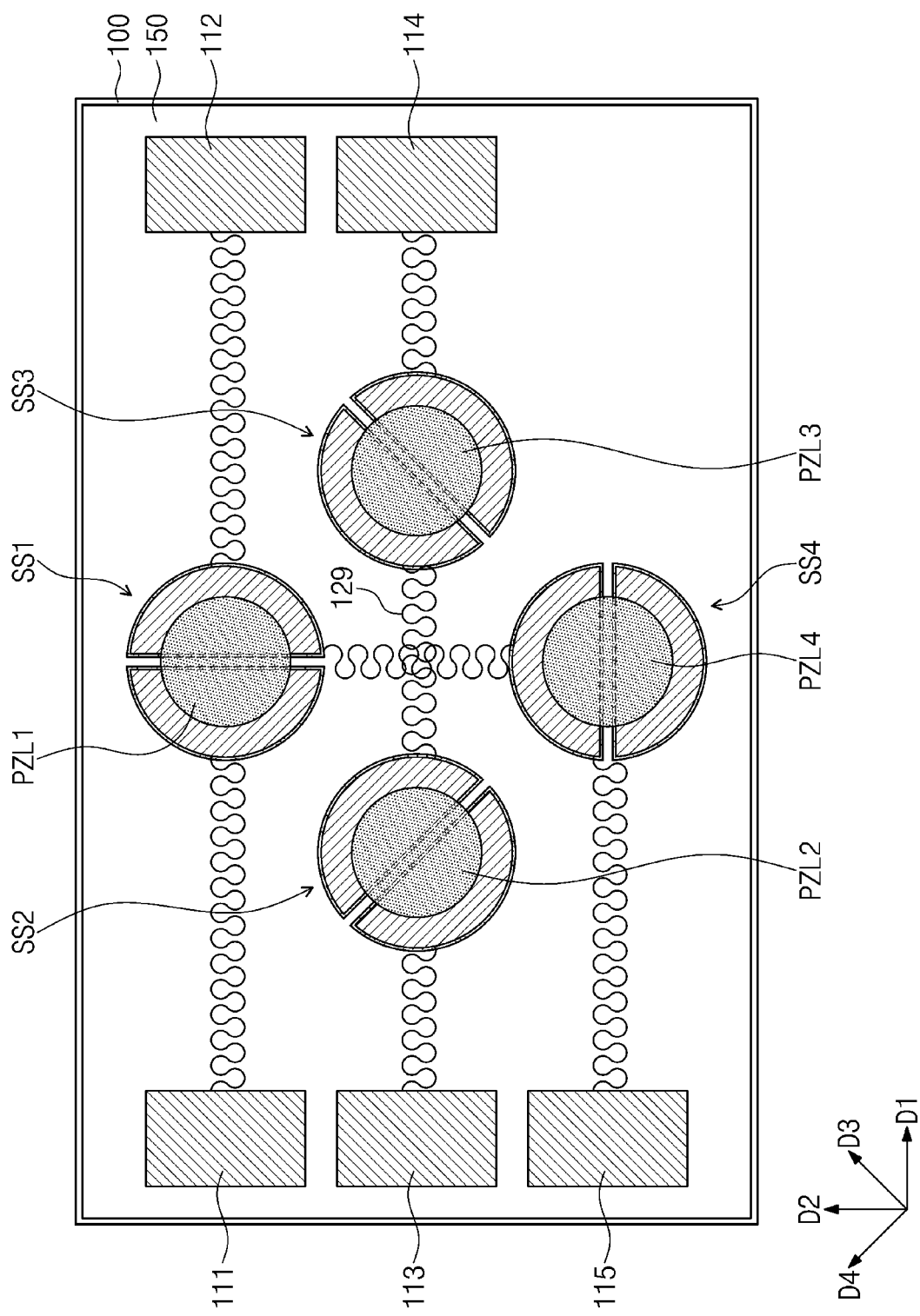

Referring to FIG. 9, a strain sensor including first to fourth sensor structures SS1, SS2, SS3, and SS4 may be provided. First to fourth piezoresistive layers PZL1, PZL2, PZL3, and PZL4 may output different detection signals with respect to an external force applied to a flexible substrate 100 in the same direction. Some electrodes of the first to fourth sensor structures SS1, SS2, SS3, and SS4 may be connected to each other by a common wire 129.

Figure 10:
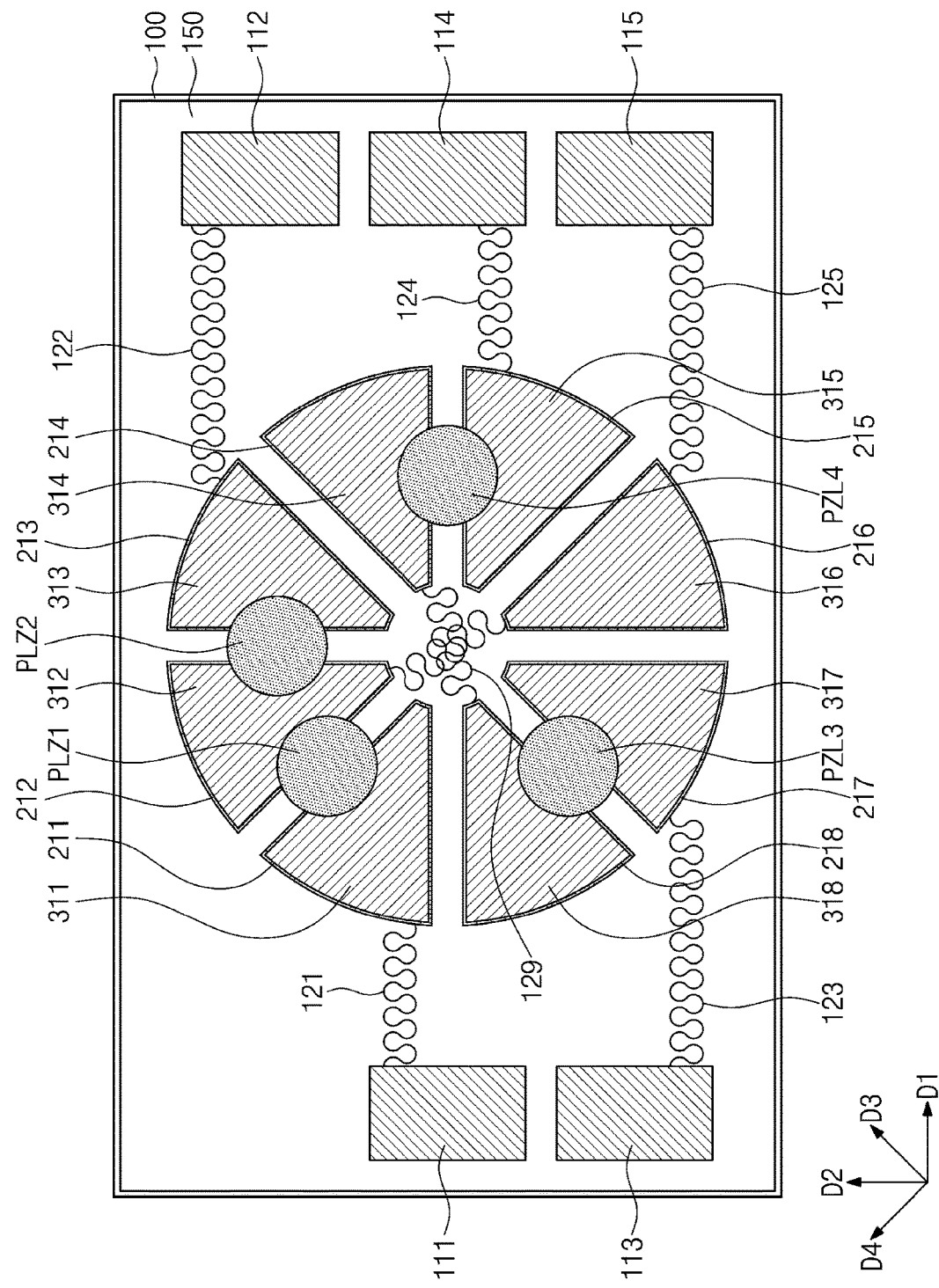

Referring to FIG. 10, a strain sensor may include first to eighth patterns 211, 212, 213, 214, 215, 216, 217, and 218, first to eighth electrodes 311, 312, 313, 314, 315, 316, 317, and 318, and first to fourth piezoresistive layers PZL1, PZL2, PZL3, and PZL4. The first to eighth electrodes 311, 312, 313, 314, 315, 316, 317, and 318 may be disposed on the first to eighth patterns 211, 212, 213, 214, 215, 216, 217, and 218, respectively. Two adjacent patterns of the first to eighth patterns 211, 212, 213, 214, 215, 216, 217, and 218 may be spaced apart from each other in one direction of first to fourth directions D1, D2, D3, and D4. The fourth direction D4 may be parallel to a top surface of a support substrate 100 and perpendicular to the third direction D3.

A first piezoresistive layer PZL1 may connect the first electrode 311 and the second electrode 312. A second piezoresistive layer PZL2 may connect the second electrode 312 and the third electrode 313. A third piezoresistive layer PZL3 may connect the seventh electrode 317 and the eighth electrode 318. A fourth piezoresistive layer PZL4 may connect the fourth electrode 314 and the fifth electrode 315.

The first electrode 311 may be connected with a first pad 111 through a first wire 121. The third electrode 313 may be connected with a second pad 112 through a second wire 122. The fifth electrode 315 may be connected with a fourth pad 114 through a fourth wire 124. The sixth electrode 316 may be connected with a fifth pad 115 through a fifth wire 125. The seventh electrode 317 may be connected with a third pad 113 through a third wire 123. The second electrode 312, the fourth electrode 314, the sixth electrode 316, and the eighth electrode 318 may be electrically connected to each other through a common wire 129.

Figure 11:
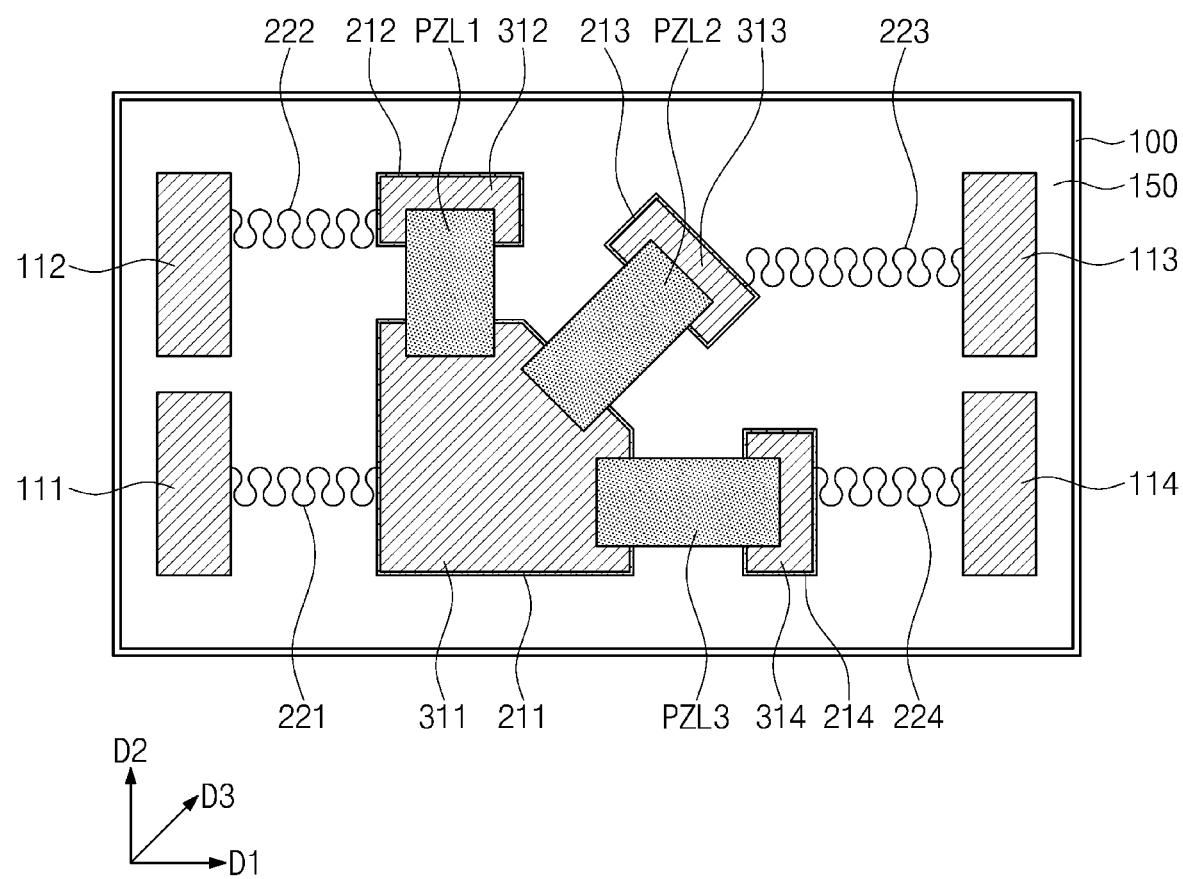

Referring to FIG. 11, a strain sensor may include first to fourth patterns 211, 212, 213, and 214, first to fourth electrodes 311, 312, 313, and 314, and first to third piezoresistive layers PZL1, PZL2, and PZL3. The first to fourth electrodes 311, 312, 313, and 314 may be disposed on the first to fourth patterns 211, 212, 213, and 214, respectively.

The first electrode 311 may be a common electrode connected with the second to fourth electrodes 312, 313, and 314 through the first to third piezoresistive layers PZL1, PZL2, and PZL3. The first pattern 211 may be disposed below the first electrode 311. The first pattern 211 may have three side surfaces facing the second to fourth patterns 212, 213, and 214, respectively, in the first to third directions D1, D2, and D3. The second electrode 212 and the first patterns 211 may be spaced apart from each other in the second direction D2. The third patterns 213 and the first patterns 211 may be spaced apart from each other in the third direction D3. The fourth patterns 214 and the first patterns 211 may be spaced apart from each other in the first direction D1.

According to the embodiment of the inventive concept, the strain sensor capable of detecting the direction of the strain by using the difference in sensitivity according to the direction in which the external force is applied may be provided. Also, according to the embodiment of the inventive concept, the strain sensor that is capable of detecting the strains in multiple directions, has the high sensing accuracy, is easily manufactured, and has the improved reliability may be provided.

Those with ordinary skill in the technical field of the inventive concept pertains will be understood that the present disclosure can be carried out in other specific forms without changing the technical idea or essential features. Thus, the above-disclosed embodiments are to be considered illustrative and not restrictive.

What is claimed is:

1. A strain sensor comprising:
   a flexible substrate;
   an upper capping layer on the flexible substrate;
   rigid patterns on the flexible substrate, the rigid patterns comprising a first pattern and a second pattern spaced apart from the first pattern in a first direction;
   a first electrode on the first pattern;
   a second electrode on the second pattern, the second electrode being spaced apart from the first electrode; and
   a piezoresistive layer connecting the first electrode and the second electrode, wherein
   each of the rigid patterns has a stiffness greater than that of the flexible substrate,
   the first pattern has a first thickness in a second direction perpendicular to the first direction,
   the piezoresistive layer has a second thickness in the second direction,
   the first thickness is greater than the second thickness,
   the rigid patterns have side surfs that face each other,
   the piezoresistive layer vertically overlaps the side surfaces of rigid patterns that face each other,
   the upper capping layer contacts with a side the piezoresistive layer, side surfaces of the first and second electrodes, and at least part of upper surfaces of the first and second electrodes, and
   a width of the first pattern in the first direction is the same as a width of the first electrode in the first direction.

2. The strain sensor of claim 1, wherein each of the rigid patterns has a stiffness greater than that of the piezoresistive layer.

3. The strain sensor of claim 1, wherein a distance between the first pattern and the second pattern is greater than a thickness of the first pattern.

4. The strain sensor of claim 1, wherein the first pattern has a first side surface that faces the second pattern, and
   the second pattern has a second side surface that faces the first side surface and is parallel to the first side surface.

5. The strain sensor of claim 1, wherein the first pattern has a first side surface that faces the second pattern, and the second pattern has a second side surface that faces the first side surface, and
   a distance between the first side surface and the second side surface is constant along a second direction perpendicular to the first direction.

6. The strain sensor of claim 5, wherein each of the rigid patterns has a stiffness greater than that of an upper capping layer.

7. The strain sensor of claim 1, further comprising a first pad electrically connected to the first electrode and a second pad electrically connected to the second electrode, which are disposed on the flexible substrate.

8. The strain sensor of claim 1, further comprising a wire connected to the first electrode,
   wherein the wire has a serpentine-pattern shape.

* * * * *